March 28, 1961   E. A. ROCKWELL   2,976,847
RESERVOIR BRAKE INTENSIFIER APPARATUS
Filed June 2, 1955   7 Sheets-Sheet 1

INVENTOR
Edward A. Rockwell
BY
Arthur Wright
ATTORNEY

United States Patent Office

2,976,847
Patented Mar. 28, 1961

2,976,847
RESERVOIR BRAKE INTENSIFIER APPARATUS
Edward A. Rockwell, Shaker Heights, Ohio
(167 Ashdale Place, Los Angeles 49, Calif.)
Filed June 2, 1955, Ser. No. 512,709
14 Claims. (Cl. 121—41)

My invention relates particularly to an apparatus to be used as a power unit, by means of which intensified pressures may be obtained for the operation of any desired device, but which may be applied especially to the operation of brakes for airplanes, automobiles, etc.

The object of my invention is to provide a power unit apparatus of the above character which is effective in operation and in which the parts may be readily assembled. A further object is to provide a power unit of this character in which the plunger or plungers are capable of self-alignment in assembling the same and in the operation of the power unit. A further object is to provide a construction for this purpose in which there is provided a manually operated plunger and a power intensifying plunger which are coaxially arranged and preferably on opposite sides of a movable wall or power piston for applying fluid pressure to the operation of the power intensifying plunger. One of the objects is, furthermore, to provide a hydraulic power unit constructed so that the liquid does not flow through it, thus simplifying the manufacture and cost of construction thereof. Another object is to provide an effective form of valve therein, in the form of a single elastic or rubber grommet, for controlling the application of the fluid pressure to the movable wall or power piston. Still another object is to so construct the power unit that the movable wall, which may be in the form of or have thereon a diaphragm, is so mounted as to enable the central portion thereof to act independently to provide a reaction or "feel" in the manual operation of the power unit. Also, preferably, the power intensifying plunger is arranged within the air inlet passageway so as thereby to make the apparatus shorter and more compact. Also, for quickness of assembly the power intensifying plunger is combined with the hydraulic cut-off valve so that they may be assembled and inserted into the power unit together. Also, they may be removable together for the same reasons. Further objects of my invention will appear from the detailed description of the same hereinafter.

While my invention is capable of embodiment in many different forms, for the purpose of illustration I have shown only certain forms of the same in the accompanying drawings, in which:

Fig. 6 is an enlarged portion, in section, of Fig. 5;

Figure 1:
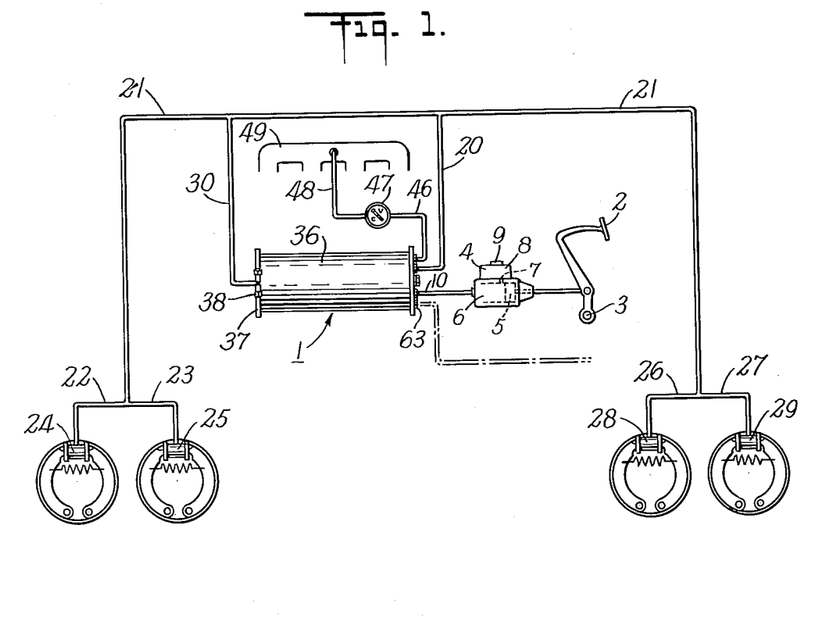
Fig. 1 is a diagrammatic representation of a circuit which may be used in the system including my power unit.
Figure 2:
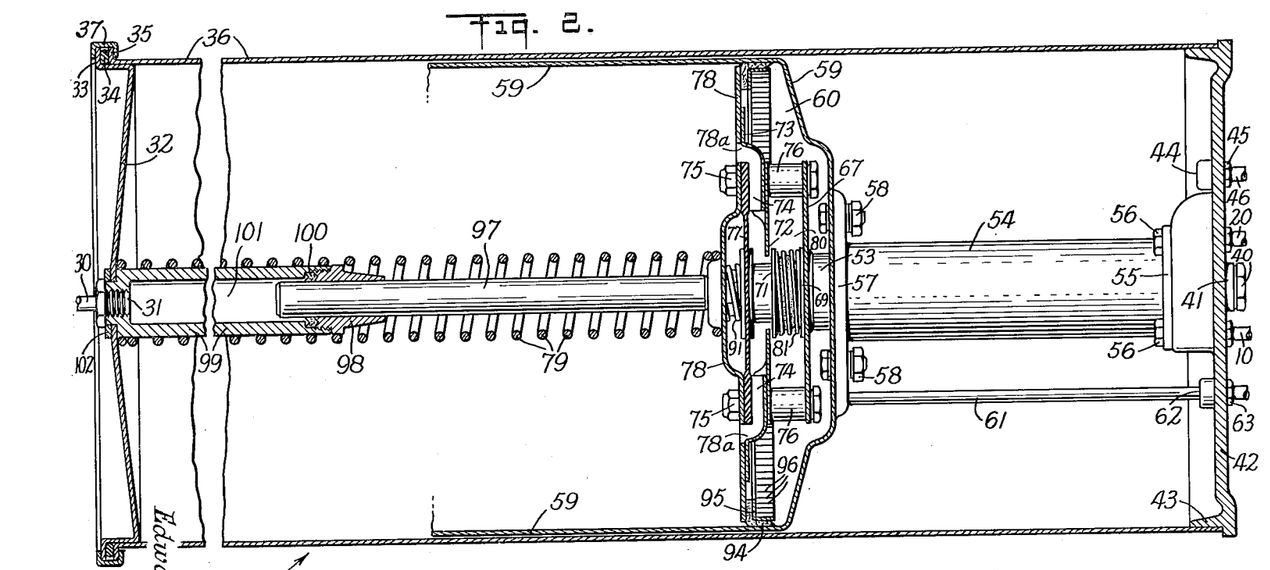
Fig. 2 is a longitudinal section of a power unit made in accordance with my invention.
Figure 3:
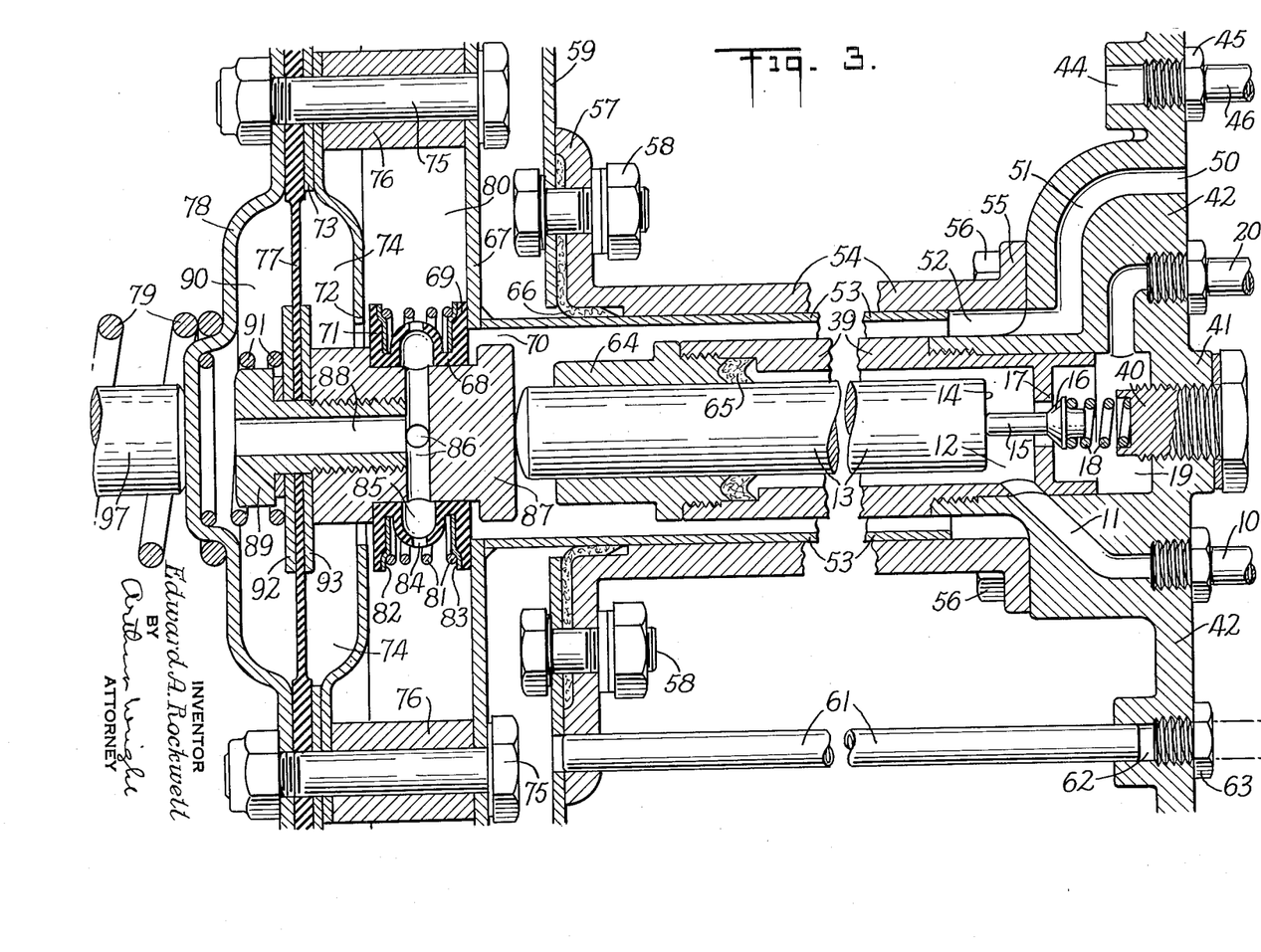
Fig. 3 is an enlarged sectional portion of Fig. 2.

In the drawings, referring first to Figs. 1 and 2, I have provided a hydraulic circuit containing a power unit 1. The said power unit 1 is operated by a pedal 2 carried on a fixed pivot 3 arranged to operate a master cylinder 4 having therein a piston 5 operating in a cylinder 6 supplied through a port 7 from a reservoir 8 having the usual vented filling cap 9. The master cylinder 4 is connected by a pipe 10 to an inlet opening 11 leading to an annular chamber 12 having therein a manually operated plunger 13, a rear end 14 of which is arranged, when in retracted position, as shown in Fig. 3, to contact with and unseat a stem 15 of a liquid compensation valve 16 normally pressed against an annular valve seat 17 by a helical spring 18. The valve 16 is seated in a chamber 19 which communicates with a branch pipe 20 for conveying hydraulic liquid initially, which is placed under manual pressure in the pipe 10 by means of the pedal 2, at which time the liquid under manual pressure will pass through the unseated valve 16, thence through the pipe 20 to a main brake line pipe 21 and then to front wheel branch pipes 22 and 23 connected to front wheel brake cylinders 24 and 25 and to rear wheel branch pipes 26 and 27 leading to rear wheel brake cylinders 28 and 29. A branch pipe 30 is also connected to the main pipe line 21 and communicates with a hydraulic delivery port 31 in an end closure 32 of the power unit 1, having a flange 33 adjacent to an annular seal 34 which abuts against a flange 35 on an outer shell 36 and to which it is fastened by a spit ring 37 U-shaped in cross-section, pressing together the flanges 33 and 35 and seal 34 so that the ends of the split ring 37 may be fastened together by means of a bolt 38.

The chamber 19 is located in a cylinder 39 and in the chamber 19 there is, furthermore, located a helical spring 18, the rear end of which rests against an adjustable plug 40 screw-threaded in a fitting 41, which has a connection leading to the pipe 20. Also, the fitting 41 has a connection leading to the pipe 10 so that the hydraulic liquid from the pipe 10 enters at a point beneath the valve 16 before being discharged initially past said valve through the pipe 20 and thence to the wheel brakes. Furthermore, the said fitting 41 has a flange 42 which forms an end closure for the casing 36 and to which it is fastened by means of a cylindrical flange 43, with the aid of welding or in any other desired manner. The end closure flange 42, furthermore, has a vacuum inlet opening 44 connected by a screw fitting 45 to an inlet pipe 46 leading by means of a check valve 47 and a pipe 48 to a manifold 49 of an internal combustion engine used for driving the airplane or automobile, on which the power unit is mounted. Also, the said flange 42 carries therein an air inlet opening 50 having a passageway 51 which leads to an annular air passageway 52 located outside of the cylinder 39 and within a cylindrical shell 53 supported in place by an outer cylinder 54 provided with a rear flange 55 secured to the fitting 41 by means of bolts 56. At its forward end, the outer cylinder 54, furthermore, is provided with a flange 57 connected by bolts 58 to a power cylinder 59 containing a cylindrical power chamber 60. Connected to this chamber 60 there is a trailer pipe connection 61 passing through the flange 57 and leading to an opening 62 normally closed by a plug 63, but which may be removed when it is desired to connect the power unit to a trailer brake system for the operation of the same. It will be noted that the forward end of the manual plunger 13 is fitted within an annular head 64 which may be screw-threaded in place and the plunger is secured in liquid-tight position thereon by means of a packing 65 of any desired character. It will be noted, also, that there is an air-tight leather seal 66 between the flange 57 and the power cylinder 59, and that this air-tight seal also abuts against the outer periphery of the cylinder 53, which has a wide flange 67 acting as an air inlet valve seat in cooperation with a rubber grommet 68 having a rear flange 69 acting as an air inlet valve therewith so as to admit air when the valve is open between the flange 69 and the valve seat 67 from an annular air passageway 70 leading to within the cylinder 53. The said rubber grommet 68, furthermore, has a forward vacuum valve flange 71 cooperating with an annular valve seat member 72 to form a vacuum valve therewith. The annular valve seat member is located adjacent to a ring 73 having a plurality of radial indentations 74 to provide passageways for the vacuum. A series of bolts 75 pass through the flange 67, a series of spacing members 76, the valve seat ring 72, the ring 73 with the radial indentations 74, and thence through a flexible reaction diaphragm 77 and an apertured plate 78, acting as a spring support and having apertures 78a, for supporting a spring 79, the other end of which rests against the end closure 32.

The spacing members 76 thus provide a space 80 for receiving the grommet 68, the two valve flanges 69 and 71 of which are kept spread apart by means of a spring 81 located between flange supporting rings 82 and 83 which rest against the valve flanges 69 and 71. A series of peripheral holes 84, in the middle of the grommet, communicate with an annular passageway 85 in the grommet, which in turn gives access to radial passageways 86 in a central valve-supporting member 87 on which the grommet 68 is mounted. These radial passageways 86 communicate with a longitudinal central passageway 88 in a hollow screw 89 screw-threaded to the valve-supporting member 87 and provide communication with a chamber 90 beneath the plate 78, on which the member 87 and the hollow screw 89 are supported against the reaction diaphragm 77, the inner periphery of the diaphragm 77 being supported between clamping rings 92 and 93. The plate 78, furthermore, supports at its periphery, a leather piston ring 94 having within the same a metal ring 95, with alternating cuts 96 therein extending longitudinally from opposite edges thereof to retain the piston ring in place within the cylinder 59.

Abutting against the end of the plate 78, furthermore, there is provided a power plunger 97 which moves within a sleeve 98 screw-threaded to a cylinder 99 and having a packing 100 therein, so as to provide an intensified pressure chamber 101 provided with a flange 102 to which the end closure 32 is secured. This chamber 101 is connected by the pipe 30 to the brake cylinders of the front and rear wheel brakes, as previously described.

Figure 4:
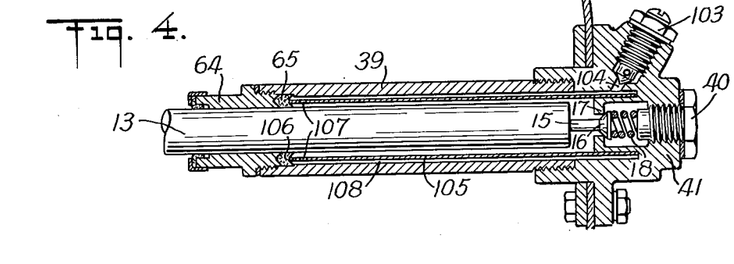
Fig. 4 is a longitudinal section of a modified form of the manually moved plunger used in connection with my power unit.

In Fig. 4 I have shown a modified form of manual plunger and cylinder construction, in which I may have the same kind of manual plunger 13 as previously described, guided within the sleeve 64 at the front end thereof and constructed so as to operate the valve 15, which is normally moved into closed position by means of the spring 18 located in the fitting 41, and which may have the spring supporting plug as well as an inlet port and an outlet port like the inlet connected to the pipe 10 and the outlet connected to the pipe 20, as previously described. In this instance, however, I may also provide an air bleeder screw 103 connected to an air opening 104 in the fitting 41. Also, in the fitting 41 there is a sleeve 105, the rear end of which is tightly supported in the fitting 41, but which extends forwardly spaced away from the periphery of the manual plunger 13 as well as away from the inner surface of the cylinder 39. A forward edge 106 of the sleeve 105 is carried tightly within the packing 65. Furthermore, the cylinder 105 has a plurality of ports 107 near its forward end. In this way, as the plunger 13 moves back and forth, any air present within the rear end of the cylinder 12 is effectively removed as a result of the reciprocation of the plunger 13, as the said air is forced out of the narrow space within the cylinder 105 through the holes 107 into a cylindrical chamber 108 outside the cylinder 105, and thence out through the air bleeder 103, whenever desired, by opening the bleeder 103 by unscrewing the same.

Referring to Figs. 5 to 10, I have shown a modified form of power unit 109 which is similar in operation to the form of my invention shown in Figs. 1 and 2, but which in this instance is provided with a diaphragm 110 instead of the pressure responsive piston 78. This diaphragm-operated power unit 109 has the same circuit connections as shown in Fig. 1 for the piston-operated power unit *i*. For this purpose, the power unit 109 has an inlet 111 from the master cylinder, by means of the pipe 10, located in a cylinder head 112 and which is provided with an outlet 113 for the delivered hydraulic pressure to the brake line 20, said outlet being located in a screw-threaded cut-off valve casing 114 having an annular rubber seal 114a. The valve casing 114 has pressed into the same a spring retainer shell 115 provided with a series of openings 116, said shell having thereon a flange 117 to fit against a shoulder 118 in the valve casing 114. A helical spring 119 is carried in the shell 115 so that one end of the said spring is supported in position by a cylindrical extension 120 on a conical valve 121 provided with a fluted valve stem 122 which extends through a valve seat sleeve 123 having an annular rubber seal 124 and held in place by a split ring 125 against the said shoulder 118. The conical valve 121 is arranged to be held off its seat 123 initially by means of a control plunger 126 in a plunger chamber 127 which has an annular chamber 128 extending around the inner end of the valve casing 114 so as, not only to receive the incoming liquid from the master cylinder pipe 10, but so as to provide a communication with an air bleeder passageway 129 having therein an air bleeder screw 130 which is provided with a small transverse port 131 normally closed by means of a removable air bleeder screw 132, which can be removed to release accumulated air from time to time whenever desired. A bushing 133 fits into the left-hand end of the said cylinder 127 where it holds in place a sealing ring 134, of any desired material, against a shoulder 135 inside the cylinder 127. The bushing 133 is retained in this position by a split ring 136. The cylinder head 112 has a cylindrical extension 137 in which the chamber 127 is located, and on the outside of the extension 137 there is a sleeve or bearing plate 138, held in position by a split ring 138a, overlying a plurality of longitudinal air passageways 139, supported by a series of projections 140 which communicate at one end with a filter chamber 141 having therein an annular filter 142 of horse hair or similar material to act as an air strainer for air received from a surrounding annular air space 143 communicating with a series of air ports 144, the filter 142 being held in position by an angular ring 145 in a filter shell 146 which has a flange 147 fastened to a flange 148 on the head 112 by means of bolts 149 having nuts 150. The rear end of the filter shell 146 is brazed or welded by a flange 151 thereon to a sleeve 152 provided with a flange 153 which is secured by bolts 154 having nuts 155 to a forward diaphragm casing 156. Also, between the flange 153 and the diaphragm casing 156 there are secured in place an outer ring 157 and an inner ring 158. The outer ring 157 serves as a guide for a slidable sleeve 159 which fits over the outside of the bearing plate 138 so as, thereby, to guide the movement of the diaphragm 110 and its attached parts in the reciprocation thereof. The rearward end of the sliding sleeve 159 has an inclined flange 160 which is brazed or welded to a valve casing ring 161 which is secured by bolts 162, having nuts 163, to the diaphragm 110 by means of diaphragm clamping plates 164 and 165.

The plate 165, furthermore, has a plurality of radial offset portions 166, between the heads of the bolts 162 and the nuts 163, and said plate 165 has an internal annular flange 167 overlying an angular sleeve 168 which is located around a tubular valve member 169 having a longitudinal central passageway 170, and provided on its rearward end with a nut 171 and washer 172. The nut 171 also serves to clamp the inner portion of the diaphragm 110, which forms a thin valve supporting diaphragm 172a, between the sleeve 168 and a clamping ring 173. The nut 171, furthermore, is located in an air chamber 174 formed by an off-set portion 175 of the diaphragm clamping plate 164 and within the chamber 174 there is a helical spring 176 which presses the valve member 169 towards the right, in Fig. 6. The central passageway 170, furthermore, communicates with a transverse passageway 177 in the valve member 169, which leads to an annular chamber 178 in a rubber grommet valve 179 having peripheral ports 180. The rubber grommet valve 179 has two flanges 181 and 182 adjacent to which there are located recessed spring-retaining plates 183 and 184 normally held outwardly by means of a helical spring 185. It will be noted that the rearward flange 181, which acts as a vacuum or outlet valve, together with a valve seat 186 formed by a portion of the inner periphery of the clamping plate 165, is initially positioned, by reason of the spring 185 not being compressed, away from the valve seat 186 so as to provide an initially open vacuum passageway 187. The forward flange 182 of the rubber grommet valve 179 acts as an air or inlet valve together with a valve seat 188 formed by means of an internal flange on the valve casing 161 and which has air ports 189. Furthermore, the tubular valve stem 169 has a head 190 thereon which is arranged to contact with the rearward end of the control plunger 126 so that, by the movement of the control plunger 126, the vacuum or outlet valve 181, 186 can be closed thereby, followed by the opening of the air or inlet valve 182, 188, by the operation of the control plunger 126.

Figure 5:
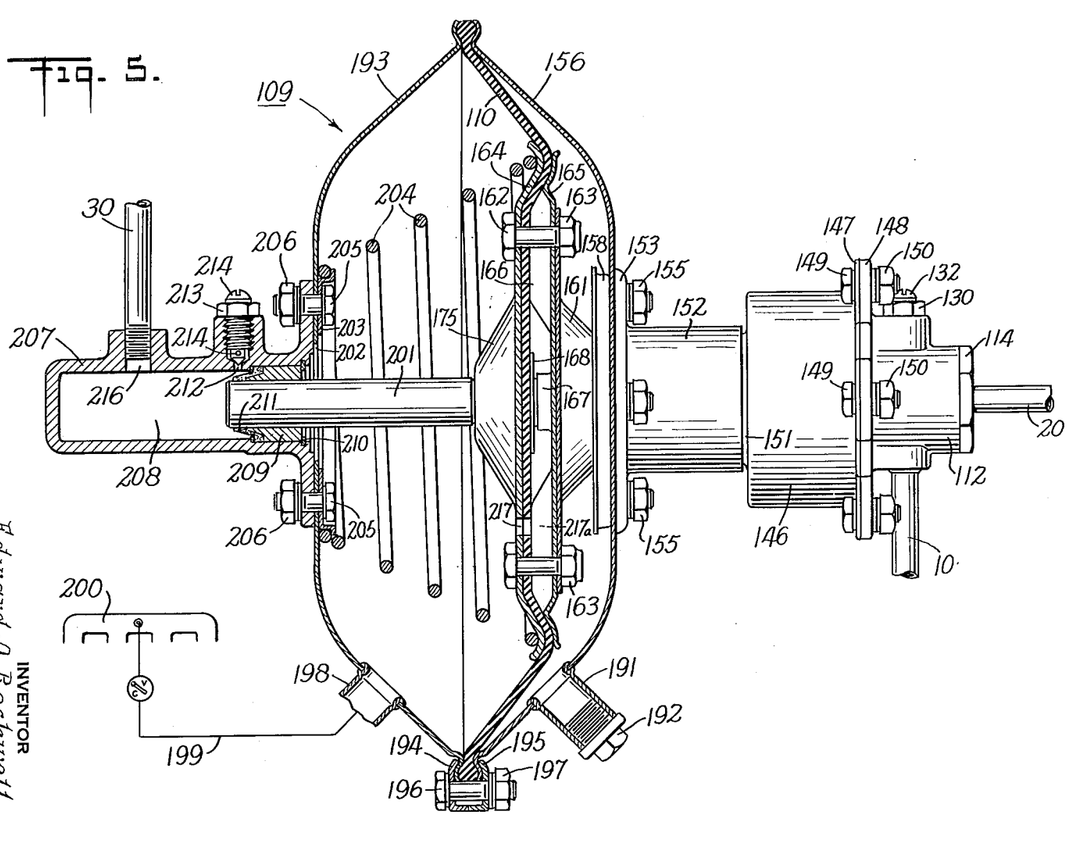
Fig. 5 is a longitudinal vertical section of a modified form of the power unit in which a pressure responsive diaphragm is used instead of the pressure responsive piston which is shown in Fig. 2.
Figure 7:
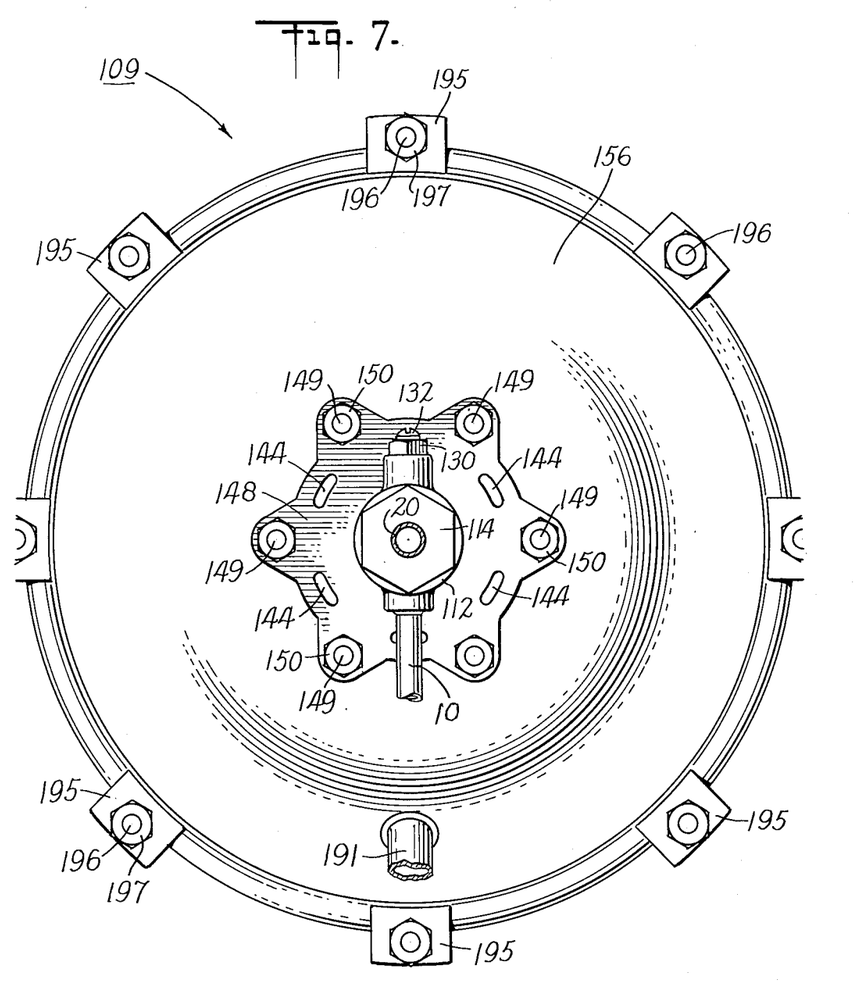
Fig. 7 is an elevation of the right-hand end of the same.
Figure 8:
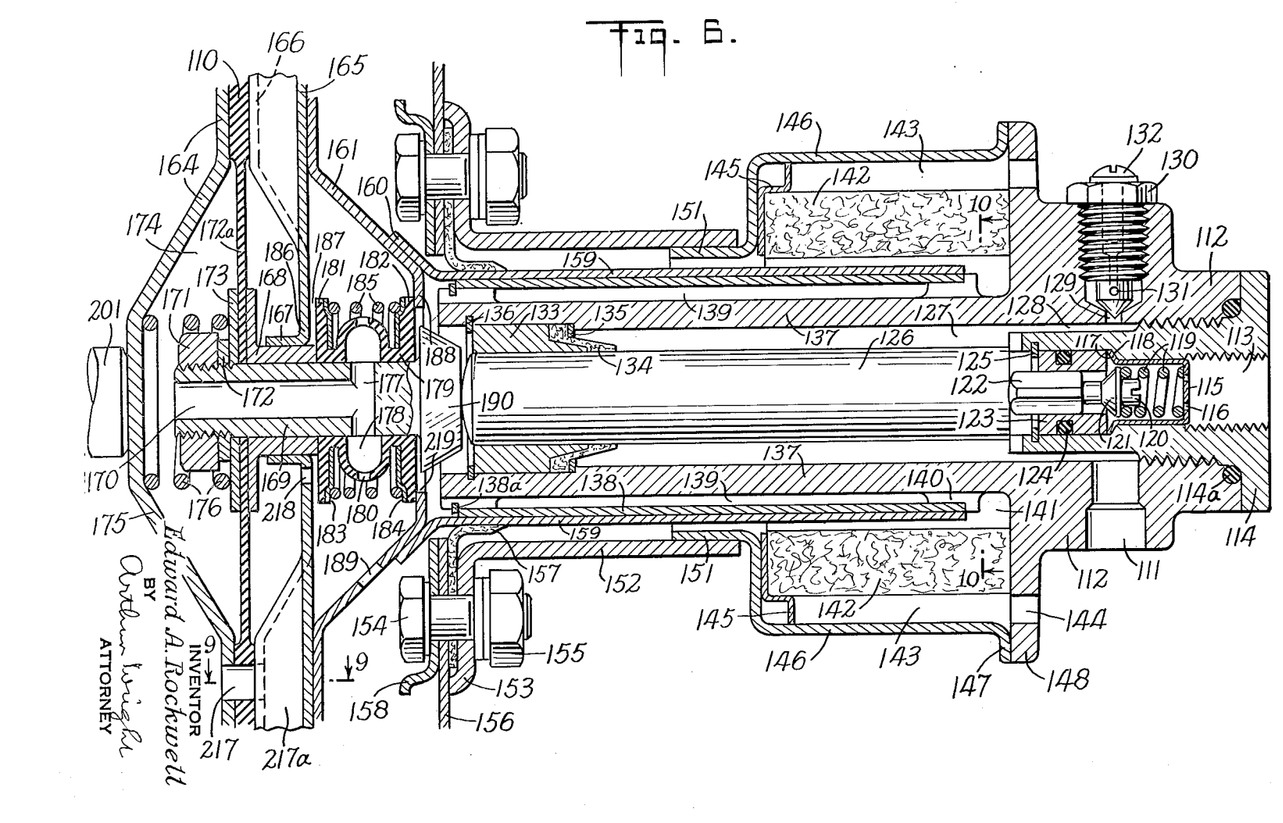
Fig. 8 is an elevation of the left-hand end of the same.
Figures 9, 10:
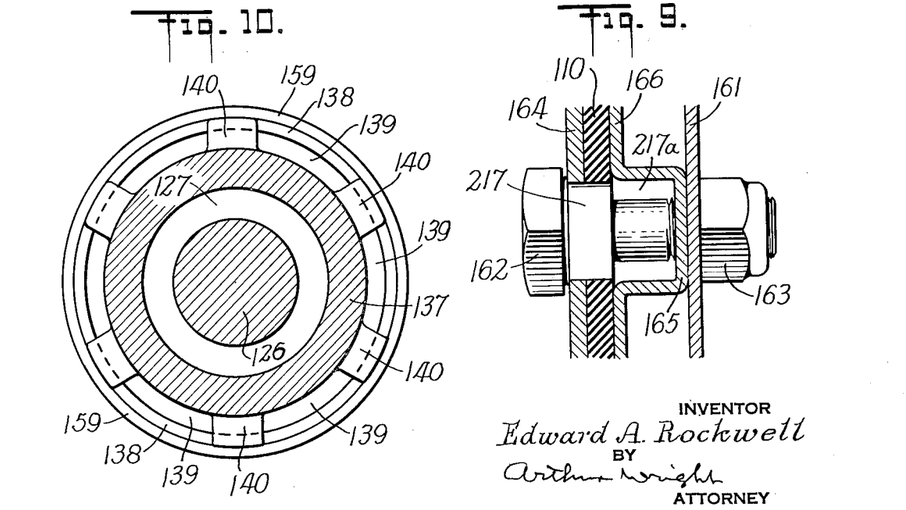
Fig. 9 is a cross-section of a detail taken on line 9—9 of Fig. 6.
Fig. 10 is a vertical section taken on line 10—10 of Fig. 6.

The forward diaphragm casing 156 is provided with a trailer connection 191, which may be closed by means of a screw plug 192. This forward diaphragm casing 156 is secured to a rear diaphragm casing 193 by means of a series of U-shaped clamping plates 194 and 195 which are fastened together by means of clamping bolts 196 having nuts 197. The rearward reaction diaphragm casing 193 is, furthermore, provided with a vacuum port 198 which leads by a pipe 199 to a manifold 200 of the automobile internal combustion engine or any other suitable source of vacuum. Also within the diaphragm casing 193 there is a pressure intensifying plunger 201, the forward end of which rests against the off-set portion 175 of the diaphragm clamping plate 164 and thence passes outwardly through an opening 202 in the casing 193 and through a spring retaining ring 203 for holding in place a control spring 204, the other end of which rests against the periphery of the diaphragm clamping plate 164. Bolts 205, having nuts 206, secure the spring retaining plate 203 to the casing 193 and to a pressure intensifying cylinder 207 having a pressure intensifying chamber 208 for receiving the plunger 201. A bushing 209 is located at one end of the chamber 208 where it is held in place by a split ring 210 so as to hold in place, at the other end of the bushing 209, a peripheral seal 211 similar to the peripheral seal 134, and which may be made of any desired sealing or packing material. Adjacent to the seal 211, furthermore, there is a bleeder screw opening 212 having therein a bleeder screw plug 213 provided with a small aperture 214 and which may be normally closed by a bleeder screw 215 which may be removed, when desired, to release any accumulated air. On the cylinder 207, furthermore, there is a delivery opening 216 for delivering the hydraulic liquid under pressure and which may be connected to the pipe 30. It will be noted that in order, initially, to submerge the diaphragm 110 in the vacuum there are provided a series of vacuum ports 217 passing through the diaphragm 110, and the diaphragm clamping plates 164 and 165, and that there are additional vacuum ports 218, leading to the right face of the diaphragm 172a, passing through the diaphragm clamping plate 165 beneath the flange 181 of the rubber grommet valve 179.

In the operation of my invention, referring first to Figs. 1 and 2, it will be understood that the liquid in the system is supplied from the reservoir 8 of the master cylinder 4. Also, it will be assumed that a vacuum is being provided from the manifold 49 by the operation of the internal combustion engine (not shown). When, now, the pedal 2 is depressed the liquid in the pipe 10, under manual pressure, will proceed initially through the valve 15 which is in open position due to retraction by the manual plunger 13 under the influence of the spring 79. The manual pressure liquid will thus be conveyed by the branch pipe 20 to the main brake pipe line 21 and thence to the front and rear wheel brake cylinders 24, 25, 28 and 29 for the operation of the brake shoes on the respective wheels of the automobile, or, similarly, if desired, on the wheels of an airplane. However, as pressure accumulates in the cylinder 12 the manual plunger 13 is moved towards the left, in Fig. 2, thus operating the valve supporting member 87 so as to then close the vacuum inlet valve 71, 72. It will be understood that prior to this time the valve 71, 72 is normally opened by the spring 91, thus providing communication for the vacuum which enters the unit through the vacuum opening 44 into the casing 36 and thence into the cylinder 60, not only to the left but to the right side of the movable wall formed by the plate 78. The vacuum has access to the left side of said movable wall through the left end of the power cylinder 59 and, when the valve 71, 72 is open before the said further manual operation of the apparatus, the said vacuum enters through the apertures 78a of the plate 78, thence through the indentations 74, through the valve 71, 72 to the space 80 to the right of the power piston formed by the plate 78. Thus, when the manual pressure increases in the cylinder 12, as above referred to, the manual piston 13 is moved towards the left, thus closing the vacuum valve 71, 72 and opening the air valve 67, 69 which accordingly admits air into the space 80 and thus into the chamber 60 at the right of the movable wall 78. The modulated amount of air pressure thus admitted from the air inlet 50 to the cylinder 60 will force the movable wall 78 to the left, in Fig. 2, to a corresponding degree, thus moving the power plunger 97 to the left and placing the liquid under an intensified pressure in the high pressure cylinder 101, due to the differential between the relative transverse areas of the power plunger 97 and the movable wall or piston within the cylinder 59. This liquid under intensified pressure, in the cylinder 101, is thus forced out of the branch pipe 30 to the main pipe 21 and thence to the front and rear wheel brakes. During the application of the intensified pressure in this manner, inasmuch as the manual piston 13 is no longer in contact with the cut-off valve stem 15, the liquid will not be delivered under the manual pressure through the pipe 20 but only under the power pressure through the pipe 30 to the main brake line 21.

The operation of the modified form of my invention shown in Fig. 4, which merely shows an improved form of the right hand end of the manual plunger cylinder, operates in substantially the same way. In this instance, however, there is a more effective means for eliminating any undesirable accumulation of air within the manual cylinder 39. For this purpose there is provided, adjacent to the seal 65, the cylindrical shell or sleeve 105 which, by reason of the apertures 107, forces the air accumulated inside the sleeve 105 to pass outwardly through the apertures 107 and thence to the outside of the sleeve 105 from which point the air may be allowed to escape by occasionally opening the air bleeder 103, by unscrewing the same.

The modification of my invention shown in Figs. 5 to 10 operates in a similar manner to the previously described embodiment of my invention, inasmuch as it may be located in the same circuit system. It will be understood that, initially, the diaphragm 110 and the diaphragm 172a are submerged in the vacuum which is admitted from the vacuum port 198 and thence through the openings 217, passageways 217a, including the openings 218, through the ports 189 to the right face of the diaphragm 110 and the right face of the diaphragm 172a. Thereafter, the vacuum ports 218 and passageway 187, having been closed by the closing of the vacuum valve 181, 186, permits the air inlet ports 219 to be opened by the movement of the grommet valve flange 182 so as to admit air, for the movement of the diaphragm 110, through the ports 189. In this instance, the liquid under manual pressure being supplied to the inlet port 111 by the movement of the pedal 2, the liquid under manual pressure will first move past the cut-off valve 122, 123, as this is in open position due to the control plunger 126 being in contact with the valve stem 122, thence the liquid passes by the line 20 to the brake line 21 to operate the brake cylinder 24, 25, 28 and 29 manually. Upon further pressure being applied to the pedal 1 the control plunger 126 will begin to move, thereby seating the valve 122, 123, and cutting off any further direct supply of the manual pressure liquid to the brake cylinders. The movement of the control plunger 126 will first close the ports 218 and the passageway 187 in the vacuum or outlet valve 181, 186, thus placing the same in lapped position with the air or inlet valve 182, 188. Further movement of the control plunger 126 will then open the air valve 182, 188 so that air will be admitted to the right face of the diaphragm 110 from the air inlet ports 144. It will be understood that this will then result in the admission of the air through the longitudinal passageways 139, through the air inlet ports 219 and thence into the annular chamber within the valve casing ring 161 and thence through the ports 189, as well as through the radial openings 180, into the passageways 177 and 170 so as to act on the central portion 172a of the rubber diaphragm 110, which has vacuum trapped beneath the same, and which serves to support the valve stem 169. In this way the rubber grommet valve 179 is made responsive to the air pressures admitted to the chamber 174 to lap the valves. Modulated power pressures are, thus, applied in the operation of the brakes by the lapping of the inlet and outlet valves, followed by the opening of the inlet valve to the desired extent until the valves again become lapped. Similarly, in the off-modulation of the brakes the amount of pressure applied to the brakes can be decreased, as desired, by the reverse operation of the modulating valves until, when the pressure on the pedal 2 is entirely released, the parts will return to their original positions with the diaphragm 110 moved to the right by the conical spring 204 and the vacuum valve passageways 187 and 218 being opened. At all times in the operation there is, however, a reaction from the brake cylinders onto the foot pedal 2, indicating by the "feel" the amount of pressure which is being applied to the brakes, due especially to the diaphragm 172a. This feature is particularly important in an "in line" brake booster of the type disclosed herein because by inserting the booster in the brake line, between the master cylinder and the wheel brakes, the operator no longer feels the brake reaction due to the pull-back springs and limited movement of the wheel cylinders and brake shoes. As will be readily understood, this feature may be incorporated in other types of power units where it is desired to provide a pressure responsive reaction opposing operator actuation of the power unit valves.

While I have described my invention above in detail I wish it to be understood that many changes may be made therein without departing from the spirit of the same.

I claim:

1. A power unit for a control system having a source of pressure differing from atmosphere, comprising: a casing including a differential pressure operated movable wall, resilient means opposing work producing movement of the wall, said casing and wall defining a variable pressure chamber on one side of said wall, the opposite side of said wall being connected so as to be subject to a constant pressure, valve means for controlling the pressure in the variable pressure chamber, including a valve assembly carried by said wall having a hollow grommet comprised of at least one annular resilient disc, a flexible annular pressure responsive reaction diaphragm mounted on said movable wall and carrying said grommet, means for conveying pressure from said source to the valve assembly terminating in a ring-like member mounted coaxially of the grommet and defining a circular valve seat engageable with the face of one disc of the grommet, said latter disc and valve seat beinng movable relative to each other to form a first valve for controlling the supply of pressure from said source to the variable pressure chamber, said grommet being arranged such as to have one side adjacent said one disc subjected to the pressure in the variable pressure chamber, means supported by said movable wall defining an air passage connected to atmosphere and terminating in a circular valve seat mounted coaxially of and spaced from the ring-like member and engageable with the face of one disk of the grommet to form an air valve for controlling the supply of air to the variable pressure chamber, a selectively movable valve operator mounted coaxially of the grommet for straight line movement relative thereto, means including said valve operator defining a passage communicating with the hollow center of the grommet and connecting one side of the reaction diaphragm with the variable pressure chamber, said reaction diaphragm having the other side subject to a constant pressure such that in the power applied position of the valve means the reaction diaphragm is subjected to the differential pressure acting on the movable wall, said reaction diaphragm providing a follow-up connection between said movable wall and the valve means, one of said valves being normally closed, said valve operator being operatively engageable with the grommet upon initial increment of straight line movement acting directly and positively against the other of said valves seating the latter so as to provide a lapped position of the valve assembly, a further increment of straight line movement of the valve operator in the same direction causing directly and positively relative movement between the grommet and the valve seat of the normally closed valve to open the latter providing a power applied position of the valve means while the pressure differential builds up on the opposite sides of the movable wall, said follow-up connection shifting the latter valve to the lapped position upon movement of the movable wall to the applied position.

2. A power unit for a control system having a source of pressure differing from atmosphere, comprising: a casing including a differential pressure operated movable wall, resilient means opposing work producing movement of the wall, said casing and wall defining a variable pressure chamber on one side of said wall, the opposite side of said wall being connected so as to be subject to a constant pressure, said movable wall including a valve chamber within the movable wall, a valve assembly in said valve chamber for controlling the pressure in the variable pressure chamber and having a follow-up connection with said movable wall, including a movably mounted hollow grommet having a pair of axially spaced annular resilient discs yieldingly joined by a resilient sleeve, means for conveying pressure from said source to the valve chamber terminating in a first valve seat including a ring-like member mounted coaxially of said grommet and engageable with one disc of the grommet, said grommet and first valve seat being movable relative to each other to form a first valve for controlling the supply of pressure from said source to the variable pressure chamber, means carried by said movable wall within said casing defining an air passage connected to atmosphere and terminating in a circular valve seat spaced from the member and engageable with one disc of the grommet to form an air valve for controlling the supply of air to the variable pressure chamber, a selectively movable valve operator extending through the hollow center of the grommet and being mounted for straight line movement relative thereto, one of said valves being normally closed, said valve operator being operatively engageable with the valve seat of the other of said valves and the corresponding disc of the grommet upon initial increment of straight line movement to seat the other of said valves, a further increment of straight line movement of the valve operator in the same direction causing the grommet to move and lift the disc from the valve seat of the normally closed valve to open the latter providing a power applied position of the valve assembly while the pressure differential builds up on the opposite sides of the movable wall, said follow-up connection shifting the latter valve to the lapped position upon movement of the movable wall to the applied position.

3. A power unit for a control system having a source of pressure differing from atmosphere, comprising: a casing including a differential pressure operated movable wall, resilient means opposing work producing movement of the wall, said casing and wall defining a variable pressure chamber on one side of said wall, the opposite side of said wall being connected so as to be subject to a constant pressure, valve means for controlling the pressure in the variable pressure chamber, including a valve assembly carried by said wall having a hollow grommet comprised of at least one annular resilient disc, said valve assembly including a pressure responsive reaction element for the grommet arranged facing the movable wall and having opposed effective areas subject to the differential pressure acting on the movable wall, means for conveying pressure from said source to the valve assembly terminating in a ring-like member mounted coaxially of the grommet and defining a circular valve seat engageable with the face of one disc of the grommet, said latter disc and valve seat being movable relative to each other to form a first valve for controlling the supply of pressure from said source to the variable pressure chamber, said grommet being arranged such as to have one side adjacent said one disc subjected to the pressure in the variable pressure chamber, means supported by said movable wall defining an air passage connected to atmosphere and terminating in a circular valve seat mounted coaxially of and spaced from the ring-like member and engageable with the face of one disc of the grommet to form an air valve for controlling the supply of air to the variable pressure chamber, a selectively movable valve operator mounted coaxially of the grommet for straight line movement relative thereto, said valve assembly having a passage communicating with the hollow center of the grommet and connecting one side of the reaction element with the variable pressure chamber, said reaction element having the other side subject to a constant pressure such that in the power applied position of the valve means the reaction element is subjected to the differential pressure acting on the movable wall and provides a follow-up connection between said movable wall and the valve means, one of said valves being normally closed, said valve operator being operatively engageable with the grommet upon initial increment of straight line movement acting directly and positively against the other of said valves seating the latter so as to provide a lapped position of the valve assembly, a further increment of straight line movement of the valve operator in the same direction causing directly and positively relative movement between the grommet and the valve seat of the normally closed valve to open the latter providing a power applied position of the valve means while the pressure differential builds up on the opposite sides of the movable wall, said follow-up connection shifting the latter valve to the lapped position upon movement of the movable wall to the applied position.

4. A power unit for a control system having a source of pressure differing from atmosphere, comprising: a casing including a differential pressure operated movable wall, resilient means opposing work producing movement of the wall, said casing and wall defining a variable pressure chamber on one side of said wall, the opposite side of said wall being connected so as to be subject to a constant pressure, valve means for controlling the pressure in the variable pressure chamber, including a valve element arranged centrally on one side of said movable wall and in said variable pressure chamber such as to be peripherally subjected to the pressure therein, a flexible skirt mounted at its periphery to said movable wall and carrying a support for said valve element at its center, said valve element comprising a grommet including spaced annular flanges, a flexible hollow sleeve with its ends connected to the inner periphery of the respective flanges and receiving said support, means defining a passage through said movable wall terminating in a valve seat, said flexible skirt and support allowing movement of said valve element relative to the movable wall, so that movement in one direction seats one annular flange of said valve element on said valve seat for controlling the communication through said passage, means carried by said movable wall within said casing defining an air passage connected to atmosphere and terminating at a second valve seat arranged for cooperation with the other flange of said valve element, so that movement of the valve element in the opposite direction seats the other annular flange on said second valve seat for controlling the communication between said air passage and the variable pressure chamber, and control means for moving said valve element.

5. A power unit for a control system having a source of pressure differing from atmosphere, comprising: a casing including a differential pressure operated movable wall, resilient means opposing work producing movement of the wall, said casing and wall defining a variable pressure chamber on one side of said wall, the opposite side of said wall being connected so as to be subject to a constant pressure, valve means for controlling the pressure in the variable pressure chamber, including a movably mounted valve element carried centrally on said wall and in said variable pressure chamber such as to be peripherally subjected to the pressure therein, means defining a passage through said wall terminating in a first opening adjacent the valve element, said opening providing a first valve seat, a flexible skirt mounted at its periphery to said movable wall and carrying a valve element supported at its center, said valve element comprising a grommet including spaced annular flanges, and a flexible sleeve with its ends connected to the inner periphery of the respective flanges, said flexible skirt allowing movement of said valve element relative to the movable wall so that movement in one direction seats one annular flange on said first valve seat for controlling the communication through said passage, an inner casing mounted concentric with said first-mentioned casing, a sleeve carried by said movable wall and slidably supported within said inner casing, said sleeve defining an air passage connected to atmosphere and terminating in an opening opposite the first opening so as to provide a second valve seat, so that movement of the valve element in the opposite direction seats the other annular flange on said second valve seat for controlling the communication between said air passage and the variable pressure chamber, and control means for moving said valve element.

6. A power unit for a control system having a source of pressure differing from atmosphere, comprising: a casing including a differential pressure operated movable wall, resilient means opposing work producing movement of the wall, said casing and wall defining a variable pressure chamber on one side of said wall, the opposite side of said wall being connected so as to be subject to a constant pressure, valve means for controlling the pressure in the variable pressure chamber, including a movably mounted valve element carried centrally on said wall and in said variable pressure chamber so as to be peripherally subjected to the pressure therein, said valve element including spaced annular flanges, means defining a passage through said movable wall between said chambers terminating in a first valve seat adjacent the valve element and arranged for cooperation with one flange thereof, so that movement of said valve element in one direction seats said annular flange on said first valve seat for controlling the communication through said passage, an inner casing mounted concentric with said first-mentioned casing, a sleeve carried by said movable wall and slidably supported within said inner casing, said sleeve defining an air passage connected to atmosphere and terminating in a second valve seat opposite the first valve seat and arranged for cooperation with the other flange of said valve element, so that movement of said valve element in the other direction seats the other annular flange on said second valve seat for controlling the communication between said air passage and the variable pressure chamber, and control means for moving said valve element.

7. A power unit for a control system having a source of pressure differing from atmosphere, comprising: a casing including a differential pressure operated movable wall, resilient means opposing work producing movement of the wall, said casing and wall defining a variable pressure chamber on one side of said wall, the opposite side of said wall being connected so as to be subject to a constant pressure, valve means for controlling the pressure in the variable pressure chamber, including a movably mounted valve element carried by said wall in said variable pressure chamber such as to be peripherally subjected to the pressure therein, means defining a passage through said movable wall terminating in a first valve seat adjacent one end of the valve element, means defining an air passage terminating in a second valve seat adjacent the other end of the valve element and axially opposite to the first valve seat, said valve element being mounted between the valve seats, and means for moving the valve element axially relative to the respective valve seats such that initial increments of movement of said valve element seat the latter on said first valve seat defining the lapped position of said valve means and additional increments of movement of said valve element selectively control the communication through the passages.

8. A power unit for a control system having a source of pressure differing from atmosphere, comprising: a casing including a differential pressure operated movable wall, resilient means opposing work producing movement of the wall, said casing and wall defining a variable pressure chamber on one side of said wall, the opposite side of said wall being connected so as to subject to a constant pressure, valve means for controlling the pressure in the variable pressure chamber, including a valve element arranged centrally on said movable wall in said variable pressure chamber such as to be peripherally subjected to the pressure therein, a flexible skirt mounted at its periphery to said movable wall and carrying a support at the center of said skirt for said valve element, said valve element comprising a grommet including spaced annular flanges, and a flexible tubular grommet body with its ends connected to the inner periphery of the respective flanges, slidable on the support, means defining a passage through said movable wall terminating in a first valve seat adjacent the valve element and arranged for cooperation with the outer face of one annular flange thereof, means defining an air passage terminating in a second valve seat arranged for cooperation with the outer face of the other annular flange of said valve element, a spring between the annular flanges urging them outward toward the valve seats, control means for moving said valve element support axially, and shoulders carried on the support for engaging the grommet and moving it relative to the movable wall, to adjust the annular flanges relative to the respective valve seats and control the communication through the passages.

9. A power unit for a control system having a source of pressure differing from atmosphere, comprising: a casing including a differential pressure operated movable wall, resilient means opposing work producing movement of the wall, said casing and wall defining a variable pressure chamber on one side of said wall, the opposite side of said wall being connected so as to be subject to a constant pressure, valve means for controlling the pressure in the variable pressure chamber, including a movably mounted valve element carried centrally on said wall and in said variable pressure chamber such as to be peripherally subjected to the pressure therein, means defining a passage through said movable wall between said chambers terminating in a first valve seat adjacent the valve element and arranged for cooperation therewith, an inner casing mounted concentric with said first-mentioned casing and the end thereof spaced from the movable wall, a sleeve carried by said movable wall and slidably supported in said inner casing, said sleeve defining an air passage terminating in a second valve seat arranged opposite to the first valve seat for cooperation with said valve element, said valve element comprising an elastic grommet valve including spaced annular flanges, and a resilient sleeve with its ends connected to the inner periphery of the respective flanges, the outer faces of said annular flanges providing valve heads for seating on said valve seats, a spring between said annular flanges forcing the same apart and toward the valve seats, a support slidable axially inside said grommet and carried by the movable wall, a control member for moving said support, and means for transmitting movement of said support to said valve element to adjust the annular flanges of the grommet relative to the respective valve seats for controlling the pressure in the variable pressure chamber.

10. A power unit for a control system having a source of pressure differing from atmosphere, comprising: a casing including a differential pressure operated movable wall, resilient means opposing work producing movement of the wall, said casing and wall defining a variable pressure chamber on one side of said wall, the opposite side of said wall being connected so as to be subject to a constant pressure, valve means for controlling the pressure in the variable pressure chamber, including a movably mounted valve element carried centrally on said wall in said variable pressure chamber such as to be peripherally subjected to the pressure therein, means defining a passage through said movable wall terminating in a valve seat adjacent the valve element, said valve element being movable relative to the movable wall in one direction toward said valve seat for controlling the communication through said passage, an inner casing mounted in said first-mentioned casing in said variable pressure chamber at the end spaced from the movable wall, means carried by said movable wall slidable within said inner casing and defining an air passage connected to the atmosphere and terminating in a second valve seat arranged for cooperation with said valve element, said valve element being movable relative to the movable wall in the opposite direction toward said second valve seat for controlling the communication between said air passage and the variable pressure chamber, a cylinder in said inner casing, a piston slidable within said cylinder, a sleeve in the cylinder providing an air accumulation chamber outside the same, and an air bleeder connected thereto, and means for transmitting movement of said piston to said valve element to move the latter relative to the respective valve seats.

11. A power unit for a control system having a source of pressure differing from atmosphere, comprising: a casing including a differential pressure operated movable wall, resilient means opposing work producing movement of the wall, said casing and wall defining a variable pressure chamber on one side of said wall, the opposite side of said wall being connected so as to be subject to a constant pressure, valve means for controlling the pressure in the variable pressure chamber, including pressure plate means mounted on the variable pressure chamber side of said movable wall in the center thereof and defining a chamber with said movable wall, a passage through the movable wall and establishing communication between said last-mentioned chamber and said constant pressure chamber, a movably mounted valve element carried centrally of said movable wall in said variable pressure chamber such as to be peripherally subjected to the pressure therein, said valve element comprising a grommet including spaced annular flanges, and a resilient sleeve with its ends connected to the inner periphery of the respective flanges, a passage through said plate means terminating adjacent the valve element at a first valve seat, said valve element being movable relative to the movable wall in one direction to engage one annular flange of the grommet with said valve seat for controlling the communication through said passages between said constant pressure and variable pressure chambers, an inner casing mounted in said first-mentioned casing in the variable pressure chamber at the end spaced from the movable wall, a sleeve carried by said movable wall and slidably supported within said inner casing, said sleeve defining an air passage connected to the atmosphere and terminating in a second valve seat arranged for cooperation with the other flange of the grommet for controlling the communication between said air passage and the variable pressure chamber, and means for moving said valve element for selectively controlling the pressure in the variable pressure chamber by movement of the annular flanges of the grommet relative to their respective valve seats including a movable support for the grommet received in the sleeve thereof and mounted at the center of the movable wall, and a control member for moving said support.

12. A power unit comprising a casing, a differential fluid pressure operated movable wall dividing said casing to provide a constant pressure chamber and a variable pressure chamber on the opposite sides thereof, a movably mounted valve element carried by said wall in one of said chambers such as to be peripherally subjected to the pressure therein, means defining a passage through said movable wall between said chambers and terminating in a valve seat adjacent one end of said valve element, said valve element being movable relative to the movable wall in one direction toward said valve seat for controlling the communication through said passage, means defining a second passage terminating at a second valve seat arranged opposite to said first valve seat for cooperation with the other end of said valve element, said valve element being located between the valve seats and movable relative to the movable wall in the opposite direction toward said second valve seat for controlling the communication between said second passage and the pressure chamber surrounding said valve element, and control means for moving said valve element relative to the movable wall and said valve seats such that initial increments of movement of said valve element seat the latter on said first valve seat defining the lapped position of said valve means and additional increments of movement of said valve element selectively control the pressure in the variable pressure chamber.

13. A valve comprising an elastic grommet including a pair of resilient annular flanges connected by a tubular resilient grommet body, means defining axially spaced opposed circular valve seats engageable by the outer faces of said flanges respectively, and a central actuating member slidably receiving said grommet body and having longitudinally spaced means abutting the outer faces of said flanges and effective upon axial movement of said actuating member to shift the grommet and selectively engage or disengage the flanges of the latter on said valve seats.

14. A valve comprising an elastic grommet including a pair of resilient annular flanges connected by a tubular resilient grommet body, means defining axially spaced opposed circular valve seats engageable by the outer faces of said flanges respectively, a compression spring between said flanges tending to urge the latter apart and into engagement with said valve seats, and a central actuating member slidably receiving said grommet body and having longitudinally spaced means abutting the outer faces of said flanges and effective upon axial movement of said actuating member to shift the grommet and selectively engage or disengage the flanges of the latter on said valve seats.

References Cited in the file of this patent

UNITED STATES PATENTS

| | | |
|---|---|---|
| 829,120 | Mumford | Aug. 21, 1906 |
| 1,575,771 | King | Mar. 9, 1926 |
| 2,152,084 | Paine | Mar. 28, 1939 |
| 2,275,697 | Stelzer | Mar. 10, 1942 |
| 2,359,687 | Stelzer | Oct. 3, 1944 |
| 2,370,582 | Rodway | Feb. 27, 1945 |
| 2,383,618 | Rockwell | Aug. 28, 1945 |
| 2,536,461 | Price | Jan. 2, 1951 |
| 2,598,604 | Ringer | May 27, 1952 |
| 2,617,261 | Ringer | Nov. 11, 1952 |
| 2,631,433 | Thomas | Mar. 17, 1953 |
| 2,654,224 | Price | Oct. 6, 1953 |
| 2,690,740 | Hupp | Oct. 5, 1954 |
| 2,735,268 | Stelzer | Feb. 21, 1956 |
| 2,752,892 | Banker | July 3, 1956 |
| 2,792,686 | Ingres | May 21, 1957 |

FOREIGN PATENTS

| | | |
|---|---|---|
| 955,910 | France | July 4, 1949 |
| 689,334 | Great Britain | Mar. 25, 1953 |